(12) United States Patent
Hatsuda et al.

(10) Patent No.: US 8,305,547 B2
(45) Date of Patent: Nov. 6, 2012

(54) METHOD OF MANUFACTURING POLARIZER, POLARIZER, POLARIZING PLATE, OPTICAL FILM, METHOD OF MANUFACTURING COMPOSITE POLARIZING PLATE, COMPOSITE POLARIZING PLATE AND IMAGE DISPLAY

(75) Inventors: Ryota Hatsuda, Ibaraki (JP); Seiji Umemoto, Ibaraki (JP); Kazuya Hada, Ibaraki (JP); Hiroyuki Yoshimi, Ibaraki (JP); Satoshi Hirata, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 733 days.

(21) Appl. No.: 12/521,420

(22) PCT Filed: Nov. 12, 2007

(86) PCT No.: PCT/JP2007/071936
§ 371 (c)(1),
(2), (4) Date: Jun. 26, 2009

(87) PCT Pub. No.: WO2008/081651
PCT Pub. Date: Jul. 10, 2008

(65) Prior Publication Data
US 2010/0321613 A1     Dec. 23, 2010

(30) Foreign Application Priority Data

Dec. 28, 2006 (JP) ................. 2006-354880
Aug. 10, 2007 (JP) ................. 2007-208912

(51) Int. Cl.
*G02F 1/13* (2006.01)
*G02F 1/1335* (2006.01)
(52) U.S. Cl. .................... 349/187; 349/96
(58) Field of Classification Search ............. None
See application file for complete search history.

(56) References Cited

U.S. PATENT DOCUMENTS 6,746,633 B2     6/2004 Sakamaki et al.
(Continued)

FOREIGN PATENT DOCUMENTS

CN          1412580 A       4/2003
(Continued)

OTHER PUBLICATIONS

International Search Report of PCT/JP2007/071936, Mailing Date of Feb. 5, 2008.

(Continued)

*Primary Examiner* — Wen-Ying P Chen
(74) *Attorney, Agent, or Firm* — Westerman, Hattori, Daniels & Adrian, LLP (57) ABSTRACT

A method of manufacturing a polarizer is provided that makes it possible to virtually simultaneously perform a contact of a hydrophilic polymer film with liquid and stretch of the hydrophilic polymer film in a width direction by a tenter method, or the like, using a small and simple manufacturing equipment. A method of manufacturing a polarizer includes a width direction stretching process for stretching a hydrophilic polymer film 1 in the width direction, which is continuously supplied, by gripping both ends in a width direction thereof with grip means 2 and moving the grip means 2 in a longitudinal direction of the film 1 as well as by bringing the film 1 into contact with liquid and also moving the grip means 2, which grips at least one of both ends in the width direction of the film 1, outwardly in the width direction of the film 1; and a dyeing process for dyeing the film 1 by a dichroic material. In the width direction stretching process, a contact with the liquid is carried out by at least one of spraying and coating of the liquid, and the width direction stretching process is carried out in at least one of the dyeing process and a process other than the dyeing process.

16 Claims, 6 Drawing Sheets

U.S. PATENT DOCUMENTS

| | | |
|---|---|---|
| 6,964,814 B2 | 11/2005 | Fujii et al. |
| 7,023,505 B2 | 4/2006 | Sakamaki et al. |
| 2002/0008840 A1 | 1/2002 | Sakamaki et al. |
| 2003/0071938 A1* | 4/2003 | Hamamoto et al. ............ 349/96 |
| 2008/0007829 A1 | 1/2008 | Mizushima et al. |

FOREIGN PATENT DOCUMENTS

| | | |
|---|---|---|
| CN | 1212918 C | 8/2005 |
| JP | 1-225916 A | 9/1989 |
| JP | 2-247602 A | 10/1990 |
| JP | 2001-318230 A | 11/2001 |
| JP | 2001-343529 A | 12/2001 |
| JP | 2002-86554 A | 3/2002 |
| JP | 2002-127245 A | 5/2002 |
| JP | 2002-258043 A | 9/2002 |
| JP | 2002-341343 A | 11/2002 |
| JP | 2005-211874 A | 8/2005 |
| JP | 2006-91374 A | 4/2006 |
| JP | 2006-130809 A | 5/2006 |
| WO | 01/37007 A1 | 5/2001 |
| WO | 2006-033313 A1 | 3/2006 |
| WO | 2006/077920 A1 | 7/2006 |

OTHER PUBLICATIONS

H. Yoshimi, "Technology of Optical film for Liquid Crystal Display", O plus E, Dec. 25, 2006, pp. 47-52, vol. 29, No. 1; Ctied in ISR.

Chinese Office Action dated Dec. 27, 2010, issued in corresponding Chinese Patent Application No. 2007-80030234.9. (w/partial English translation).

Japanese Office Action dated Mar. 14, 2012, issued in corresponding Japanese Patent Application No. 2007-317564, with English translation (11 pages).

* cited by examiner

METHOD OF MANUFACTURING POLARIZER, POLARIZER, POLARIZING PLATE, OPTICAL FILM, METHOD OF MANUFACTURING COMPOSITE POLARIZING PLATE, COMPOSITE POLARIZING PLATE AND IMAGE DISPLAY

TECHNICAL FIELD

The present invention relates to methods of manufacturing polarizers, polarizers, polarizing plates, optical films, methods of manufacturing composite polarizing plates, composite polarizing plates, and image displays.

BACKGROUND ART

Polarizers are used for various liquid crystal displays (LCDs) for television sets, personal computers, cell-phones, etc. Usually, the polarizers are manufactured by dyeing and uniaxially-stretching polyvinyl alcohol (PVA) films. When a PVA film is uniaxially-stretched, the dichroic material adsorbed by (dyeing) the PVA molecules is oriented and thereby the PVA film becomes a polarizer.

Recently, the use of LCDs for television sets is increasing rapidly, and the size of the screens thereof also is increasing. Accordingly, there also are demands for an increase in size of polarizers that are used for television sets. As a method of manufacturing such large-sized polarizers, there is a proposal for a method of stretching a PVA film by a tenter method while the whole PVA film being in contact with liquid. (Patent Document 1).

[Patent Document 1] JP 2006-91374 A

DISCLOSURE OF INVENTION

However, with the aforementioned method, when a PVA film is brought into contact with liquid by immersing in a bath, the bath is required. Therefore, with the aforementioned method, a manufacturing equipment tends to be getting larger. Further, with a tenter method, an up-and-down movement of the PVA film is structurally difficult. Therefore, a combination of stretch by the tenter method and immersion of the PVA film into the bath, which are simultaneously performed, requires a very complicated structure.

One object of the present invention is to provide a method of manufacturing a polarizer that makes it possible to virtually simultaneously perform contact of a hydrophilic polymer film with liquid and stretching of the hydrophilic polymer film in a width direction by a tenter method, or the like, using a small and simple manufacturing equipment.

In order to achieve the aforementioned object, a method of manufacturing a polarizer of the present invention includes:
a width direction stretching process for stretching a hydrophilic polymer film in the width direction, which is continuously supplied, by gripping both ends in a width direction thereof with grip means and moving the grip means in a longitudinal direction of the hydrophilic polymer film as well as by bringing the hydrophilic polymer film into contact with liquid and also moving at least one of the grip means, which grip both ends in the width direction of the hydrophilic polymer film, outwardly in the width direction of the hydrophilic polymer film; and
a dyeing process for dyeing the hydrophilic polymer film by a dichroic material, wherein in the width direction stretching process, a contact with the liquid is carried out by at least one of spraying and coating of the liquid, and the width direction stretching process is carried out in at least one of the dyeing process and a process other than the dyeing process.

In order to achieve the aforementioned object, the inventors of the present invention made a series of studies. As a result, they made it possible in manufacturing polarizers to virtually simultaneously perform contact of a hydrophilic polymer film with liquid and stretch of the hydrophilic polymer film in a width direction by grip means by bringing the hydrophilic polymer film into contact with liquid at at least one surface thereof by at least one of spraying and coating. Therefore, as compared to the conventional manufacturing method that employs a bath, the manufacturing method of the present invention can downsize a manufacturing equipment. Further, since the manufacturing method of the present invention does not require an up-and-down movement of the hydrophilic polymer film, a simple manufacturing equipment (for example, a conventionally known spray device, a conventionally known tenter stretching machine, etc.) can be used. Furthermore, since the manufacturing method of the present invention can change supply amounts and types of the liquid without difficulty, it can be applied to more complicated manufacturing conditions. Moreover, according to the manufacturing method of the present invention, only the necessary amount of the liquid can be supplied to the necessary place of the hydrophilic polymer film. Therefore, the liquid to be used and to be discharged can also be reduced. Preferably, the manufacturing method of the present invention is applied in manufacturing of large-sized polarizers. However, the present invention is not limited thereto and can be applied to a manufacturing method of polarizer of any size.

DETAILED DESCRIPTION OF THE INVENTION

In the manufacturing method of a polarizer of the present invention, in the width direction stretching process, preferably, a line is imaged that connects inner ends of grip means in a width direction of the hydrophilic polymer film, the grip means being adjacent in a longitudinal direction of the film, and a region inside of the virtual line is brought into contact with the liquid and a region outside of the virtual line is not brought into contact with the liquid. When the whole hydrophilic polymer film is brought into contact with liquid and is stretched by a tenter method, there is a possibility that uneven stretching may occur in a polarizer between tenter clips. This problem was found by the inventors of the present invention for the first time. With respect to this problem, in the width direction stretching process, a line is imaged that connects inner ends of grip means in a width direction of the hydrophilic polymer film, the grip means being adjacent in a longitudinal direction of the film. Occurrence of uneven stretching of the polarizer can be prevented by bringing the region inside of the virtual line into contact with the liquid and not bringing the region outside of the virtual line into contact with the liquid.

In the manufacturing method of a polarizer of the present invention, in a contact of the liquid in the width direction stretching process, it is preferable that a region inside of a second virtual line that is 5 mm inside of the virtual line described above in a width direction of the film is brought into contact with the liquid and a region outside of the second virtual line is not brought into contact with the liquid.

In the manufacturing method of a polarizer of the present invention, examples of other processes include a swelling process for swelling the hydrophilic polymer film, a crosslinking process for crosslinking the hydrophilic polymer film, etc.

In the manufacturing method of a polarizer of the present invention, it is preferable that the dyeing process and other processes are carried out while a treatment liquid of each process being in contact with the hydrophilic polymer film. Further, it is preferable that a contact with the liquid in at least one of the width direction stretching process, the dyeing process, and other processes is carried out in a gas phase by spraying the liquid onto at least one surface of the hydrophilic polymer film. Thereby, the manufacturing method of a polarizer of the present invention can favorably be applied in manufacturing of large-sized polarizers.

Preferably, in the manufacturing method of a polarizer of the present invention, a process, in which the contact with the liquid is carried out by spraying, is carried out while feeding the hydrophilic polymer film in a longitudinal direction. Further, it is preferable that spraying is carried out in a space in which the sprayed liquid is prevented from being leaked to an external environment by a leak preventing means. In a case where the contact with the liquid is carried out by spraying, some of the liquid mist generated by spraying is not brought into contact with the hydrophilic polymer film but dispersed by air currents. In this state, spraying in the space, in which leak of the liquid is prevented, makes it possible to greatly reduce leak of the dispersed liquid to an external environment and to easily collect the dispersed liquid. As a result, health of workers is prevented from being damaged because of the dispersed liquid and reuse and disposal of the liquid after collection can be eased. The leak of the liquid is not always required to be completely prevented. The present invention is applicable as long as the leak of the liquid is practically prevented in a range in which advantage of the present invention is not undermined. Slight leak of the liquid may be allowable. For example, the liquid may slightly leak from clearance at a position where the grip means (for example, a tenter clip, etc.) is disposed. The leak preventing means is not particularly limited as long as the leak of the liquid is practically prevented, and examples thereof include a spray booth, and the like. Preferably, the spray booth has a carrying-in entrance and a carrying-out exit of the hydrophilic polymer film.

In the manufacturing method of a polarizer of the present invention, it is preferable that the pressure in the space, in which leak of the liquid is prevented, is negative to the outside (to make the pressure in the space, in which leak of the liquid is prevented, lower than pressure of the outside). For example, by making the pressure in the spray booth being negative to that of the outside, air current from the outside to the inside of the spray booth is generated, and leak of the dispersed liquid to the outside environment from the carrying-in entrance and the carrying-out exit is efficiently prevented.

In the manufacturing method of a polarizer of the present invention, it is preferable that the hydrophilic polymer film is a polyvinyl alcohol film and the dichroic material is iodine.

A polarizer of the present invention is manufactured by the aforementioned method of manufacturing a polarizer of the present invention.

A polarizing plate of the present invention includes a protective layer laminated on at least one surface of a polarizer, wherein the polarizer is the aforementioned polarizer of the present invention.

An optical film of the present invention includes a retardation film laminated on at least one surface of a polarizer or a polarizing plate, wherein the polarizer is the aforementioned polarizer of the present invention and the polarizing plate is the aforementioned polarizing plate of the present invention.

A method of manufacturing a composite polarizing plate of the present invention which includes a polarizing plate and a reflective polarizer, includes:

a process for providing a long length film polarizing plate having an absorption axis in a width direction of the film and including a polarizer of the present invention;

a process for providing a long length film reflective polarizer having a reflective axis in a width direction of the film; and a bonding process for bonding the polarizing plate and the reflective polarizer while feeding them in a longitudinal direction of the film, respectively. The reflective polarizer includes anisotropy in its function. In order to express such function in the composite polarizing plate, the polarizing plate and the reflective polarizer should be bonded in such a manner that the absorption axis of the polarizing plate and the reflective axis of the reflective polarizer being in parallel. Generally, a polarizer is manufactured by stretching its formation material in a longitudinal direction. The polarizer manufactured in this manner and the polarizing plate including the same include an absorption axis in a longitudinal direction of the film. In order to bond the polarizing plate and the reflective polarizer in such a manner that the absorption axis and the reflective axis being in parallel, the polarizing plate and the reflective polarizer should be bonded after cutting one of or both of the polarizing plate and the reflective polarizer. Therefore, the number of processes is increased and time is required for manufacturing. Further, manufacturing processes are complicated and products are low in yield. Moreover, generation of trash at the time of cutting reduces yield. In contrast, as described above, the polarizer of the present invention, which manufactured by stretching the hydrophilic polymer film in the width direction, and the polarizing plate including the same include an absorption axis in the width direction of the film, respectively. Therefore, by bonding the long length film polarizing plate and the long length film reflective polarizer while feeding them, respectively, in a longitudinal direction of the film, the composite polarizing plate, in which the absorption axis of the polarizing plate and the reflective axis of the reflective polarizer are in parallel, can continuously be manufactured. As a result, the number of processes is reduced and a brief manufacturing can be achieved. Further, manufacturing processes are simple and improved in yield.

A composite polarizing plate of the present invention is manufactured by a method of manufacturing a composite polarizing plate of the present invention.

An image display of the present invention includes at least one of a polarizer, a polarizing plate, an optical film, and a composite polarizing plate. The polarizer is the aforementioned polarizer of the present invention, the polarizing plate is the aforementioned polarizing plate of the present invention, the optical film is the aforementioned optical film of the present invention, and the composite polarizing plate is the aforementioned composite polarizing plate of the present invention.

Next, the method of manufacturing a polarizer of the present invention is explained below using an example. The method of manufacturing a polarizer of the present invention uses a hydrophilic polymer film as a material and includes a series of processes such as a swelling process, a dyeing process, a crosslinking process, a conditioning process, and a drying process, for example. The width direction stretching process is carried out in at least one of these processes or is carried out separately.

(1) Hydrophilic Polymer Film

The hydrophilic polymer film is not particularly limited and a conventionally known film can be used. Specific examples thereof include hydrophilic polymer films such as a polyvinyl alcohol (PVA) film, a partially formalized PVA film, a polyethylene terephthalate (PET) film, an ethylene-vinyl acetate copolymer film, or films obtained by partially saponifying them. In addition, oriented films formed of polyene such as dehydrated PVA or dehydrochlorinated polyvinyl chloride, as well as stretched and oriented polyvinylene films also can be used. Among these, a PVA polymer film is preferable since it can be dyed well by iodine that serves as a dichroic material described later.

Examples of the raw material polymer for the PVA polymer film include a polymer obtained by polymerizing vinyl acetate and then saponifying it, and a polymer obtained by copolymerizing vinyl acetate with a small amount of copolymerizable monomers, such as unsaturated carboxylic acid or unsaturated sulfonic acid. The polymerization degree of the PVA polymer is not particularly limited. However, in terms of, for example, the solubility to water, the polymerization degree of the PVA polymer is preferably in the range of 500 to 10000 and more preferably in the range of 1000 to 6000. Furthermore, the saponification degree of the PVA polymer is preferably at least 75 mol % and more preferably in the range of 98 to 100 mol %.

The hydrophilic polymer film (for instance, PVA film) is preferably in the form of an original film wound around a roll. The thickness of the hydrophilic polymer film (for instance, PVA film) is not particularly limited. However, the thickness thereof is, for example, in the range of 15 to 110 µm, preferably in the range of 38 to 110 µm, more preferably in the range of 50 to 100 µm, and further preferably in the range of 60 to 80 µm.

(2) Width Direction Stretching Process

Figure 1:
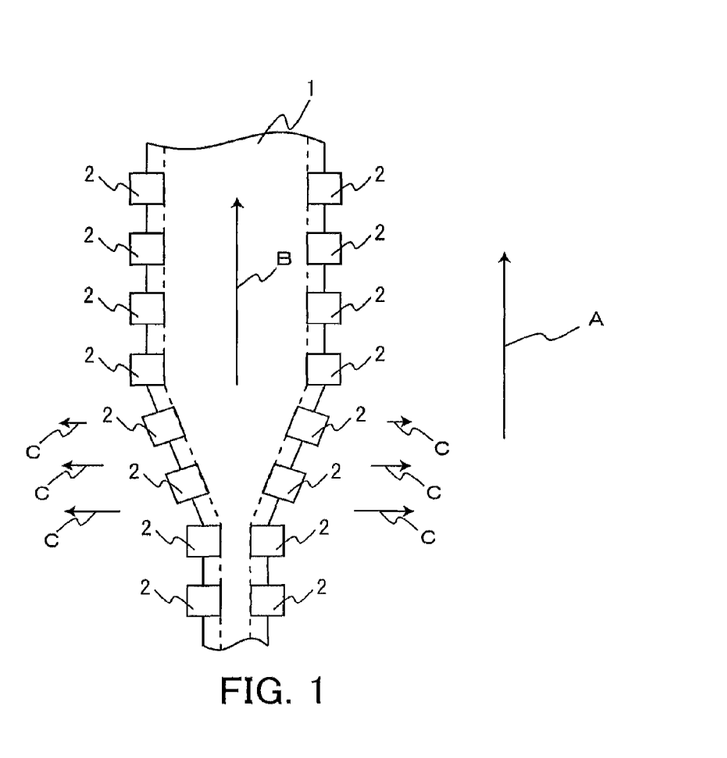
FIG. 1 is a schematic view showing an example of a stretching process of the present invention.

Next, the width direction stretching process for stretching the hydrophilic polymer film in the width direction, which is a characteristic of the present invention, is explained. Generally, the polarizer is manufactured by a series of processes of the swelling process, the dyeing process, the crosslinking process, the conditioning process, and the drying process in order. As described above, the width direction stretching process may be carried out in these processes or may be carried out separately. FIG. 1 shows a schematic view of an example of this process. As shown in FIG. 1, in this process, both ends in a width direction (a horizontal direction in FIG. 1) of a hydrophilic polymer film 1, which is continuously supplied, are gripped with grip means 2. Then, as indicated by an arrow A, the grip means 2 are moved in a longitudinal direction (an upper direction in FIG. 1) of the hydrophilic polymer film 1. Thereby, as indicated by an arrow B, the hydrophilic polymer film 1 is fed in a longitudinal direction thereof (an upper direction in FIG. 1). At the same time, the hydrophilic polymer film 1 is brought into contact with liquid and the both grip means 2, which grip both ends in the width direction of the hydrophilic polymer film 1, are also moved in the width direction of the hydrophilic polymer film 1 as indicated by arrows C to stretch the hydrophilic polymer film 1 in the width direction. The contact with the liquid is carried out by at least one of spraying and coating of the liquid in a gas phase.

As described above, in the width direction stretching process, preferably, a line is imaged that connects inner ends of the grip means 2 in a width direction of the hydrophilic polymer film 1, the grip means 2 being adjacent in a longitudinal direction (a vertical direction in FIG. 1) of the hydrophilic polymer film 1, and a region inside of the virtual line (a dashed line in FIG. 1) is brought into contact with the liquid and a region outside of the virtual line (a dashed line in FIG. 1) is not brought into contact with the liquid. Both surfaces of the hydrophilic polymer film 1 may be brought into contact with the liquid or one surface of the hydrophilic polymer film 1 may be brought into contact with the liquid. FIG. 1 shows a case in which the hydrophilic polymer film 1 is stretched in the width direction by moving the both grip means 2, which grip both ends of the hydrophilic polymer film 1, outwardly in the width direction of the hydrophilic polymer film 1. However, the present invention is not limited thereto. The hydrophilic polymer film 1 may be stretched in the width direction by moving only one of the grip means 2, which grip both ends of the hydrophilic polymer film 1, outwardly in the width direction of the hydrophilic polymer film 1.

Figure 2A:
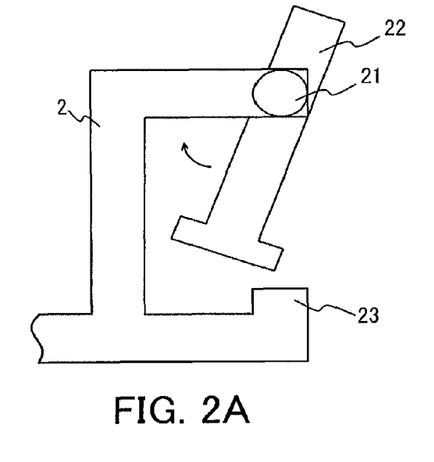
FIG. 2A and 2B are views for explaining grip of a hydrophilic polymer film by grip means of the present invention.
Figure 2B:
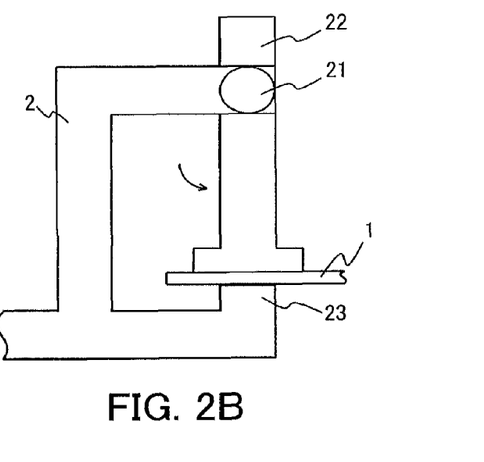

FIG. 2 shows a state in which the hydrophilic polymer film 1 is gripped with the grip means 2. As shown in FIG. 2(A), the grip means 2 is provided with a rotation axis 21, an upper grip portion 22, and a lower grip portion 23. The upper grip portion 22 is movable to inside (a left side in FIG. 2) of the grip means 2 by the rotation axis 21. In this state, as shown in FIG. 2(B), the hydrophilic polymer film 1 is gripped by putting one end of the hydrophilic polymer film 1 in the width direction thereof on the lower grip portion 23 and moving the upper grip portion 22 outwardly (a right side in FIG. 2) until being in contact with an upper surface of the hydrophilic polymer film 1.

Figure 3:
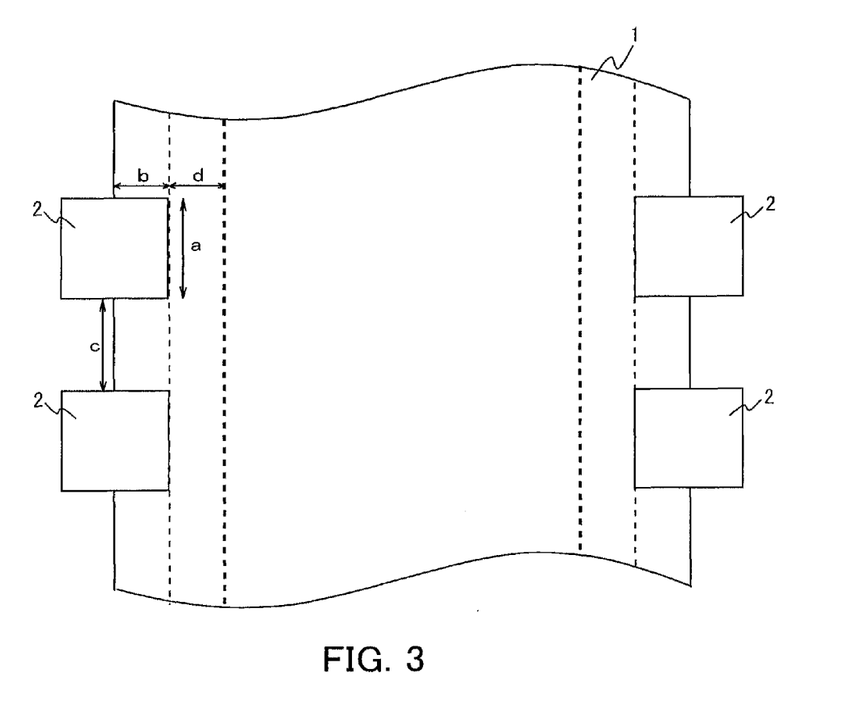
FIG. 3 is an enlarged view of a part of FIG. 1.

FIG. 3 is an enlarged view of a part of FIG. 1. The length of a portion of the hydrophilic polymer film 1 to be gripped by the grip means 2 (grip range, indicated by "a" in FIG. 3) is not particularly limited, however is, for example, in the range of 10 to 100 mm, preferably in the range of 10 to 75 mm, and more preferably in the range of 25 to 75 mm. The width of the grip range (indicated by "b" in FIG. 3) is not particularly limited, however is, for example in the range of 5 to 50 mm, preferably in the range of 10 to 30 mm, and more preferably in the range of 10 to 20 mm. Further, the distance between the grip means 2, which are adjacent in a longitudinal direction of the hydrophilic polymer film 1, (indicated by "c" in FIG. 3) is preferably as short as possible, and is, for example, in the range of 1 to 20 mm, preferably in the range of 3 to 10 mm, and more preferably in the range of 3 to 6 mm.

Further, in the contact with the liquid in this process, more preferably, a region inside of a second virtual line (a thick dashed line in FIG. 3), which is placed inside of the virtual line (a dashed line in FIG. 3) by a predetermined distance (indicated by "d" in FIG. 3) in the width direction of the hydrophilic polymer film 1, is brought into contact with the liquid and a region outside of the second virtual line (a thick dashed line in FIG. 3) is not brought into contact with the liquid. The predetermined distance (indicated by "d" in FIG. 3) is, for example, 5 mm or more, preferably 10 mm or more, more preferably 30 mm or more, and further preferably 50 mm or more. The upper limit of the predetermined distance (indicated by "d" in FIG. 3) is not particularly limited, however is 100 mm or less, for example.

Preferably, the contact with the liquid of this process is carried out in a gas phase by spraying the liquid onto at least one surface of the hydrophilic polymer film.

An arbitrary suitable spray device is used as a means for spraying the liquid onto the hydrophilic polymer film. Examples of the spray device include "MK series" (trade name) manufactured by Fuso Seiki Co., Ltd., "T-AFPV" (trade name) manufactured by DeVILBISS, and "56 series" (trade name) manufactured by ACCUSPRAY. In the spray device, the number of spray nozzles is, for example, in the range of 1 to 10, preferably in the range of 1 to 8, and more preferably in the range of 1 to 4. The pore diameter of each of the spray nozzles is, for example, in the range of 0.3 to 2 mm, preferably in the range of 0.5 to 1.5 mm, and more preferably in the range of 0.75 to 1 mm. The flow rate per spray nozzle is, for example, in the range of 10 to 1200 mL/sec, preferably in the range of 10 to 700 mL/sec, and more preferably in the range of 50 to 400 mL/sec. The spraying air pressure is, for example, in the range of 0.03 to 3 MPa, preferably in the range of 0.1 to 1 MPa, and more preferably in the range of 0.2 to 0.5 MPa. The spray angle is, for example, in the range of 45° to 135°, preferably in the range of 60° to 120°, and more preferably in the range of 80° to 100°. When plural spray nozzles are used, the distance between adjacent spray nozzles is, for example, in the range of 5 to 500 mm, preferably in the range of 25 to 300 mm, and more preferably in the range of 50 to 200 mm.

In the spraying of the liquid, the distance between the spray nozzle of the spray device and the hydrophilic polymer film can be determined suitably according to, for example, the spraying air pressure, however is preferably 20 cm or less. When the distance is in the aforementioned range, the liquid can be brought into contact with the hydrophilic polymer film reliably without loss.

The time for spraying the liquid is not particularly limited, however is preferably 20 seconds or more, more preferably in the range of 30 to 120 seconds, and further preferably in the range of 40 to 60 seconds. Further, the amount of the liquid to be sprayed onto the hydrophilic polymer film is not particularly limited, however is preferably in the range of 0.06 to 0.19 mL/1 cm$^2$. Moreover, the temperature of the liquid is not particularly limited, however is, for example, in the range of 40 to 70° C., preferably in the range of 50 to 70° C., and more preferably in the range of 60 to 70° C.

The contact with the liquid may be carried out by coating the hydrophilic polymer film with the liquid. As a means for coating the hydrophilic polymer film with the liquid, conventionally known means such as a roll coater, a die coater, a bar coater, a slide coater, a curtain coater, and the like may be used. The contact with the liquid may be carried out by both spraying and coating.

In this process, examples of a method for not bringing a region, which is outside of the virtual line (a dashed line in FIG. 3) or the second virtual line (a thick dashed line in FIG. 3), into contact with the liquid include a method of controlling a spray region of the spray device, a method of using a waterproof plate, a method of making air current toward inside of the film 1 in the width direction from the grip means 2, and combination thereof.

A stretching treatment of the hydrophilic polymer film in the width direction may be carried out using, for example, a conventionally known tenter stretching machine. The total stretching ratio of the hydrophilic polymer film in the width direction stretching process is, for example, in the range of 2 to 12 times, preferably in the range of 3 to 10 times, and more preferably in the range of 4 to 8 times relative to the length of a film before stretching (an original film), for example.

As described above, the width direction stretching process may be carried out in each process of swelling, dyeing, crosslinking, conditioning, and the like, or may be carried out separately. However, in view of improving uniformity and preventing generation of uneven stretching, in order to maximize an advantage of the outside region that is not in contact with the liquid, the stretching by the tenter method and the spraying treatment may preferably be adopted in the aforementioned all processes. When the width direction stretching process is separately carried out, the hydrophilic polymer film is stretched while being in contact with a stretching liquid.

The stretching liquid is not particularly limited and can be a solution containing, for example, boric acid, potassium iodide, various metal salts, other iodide compounds, and zinc compounds. The solvent that can be used for this solution is, for example, water or ethanol. Preferably, the stretching liquid contains, specifically, for example, boric acid and potassium iodide. The total content of the both is, for example, in the range of 2 to 18% by weight, preferably in the range of 4 to 17% by weight, and more preferably in the range of 6 to 15% by weight. Furthermore, the content ratio (A:B (weight ratio)) between the boric acid (A) and potassium iodide (B) is, for example, in the range of 1:0.1 to 1:4, preferably in the range of 1:0.2 to 1:3.5, and more preferably in the range of 1:0.5 to 1:3.

(3) Swelling Process

First, the original hydrophilic polymer film is swelled by bringing into contact with a swelling liquid.

Examples of the swelling liquid to be used include water, an aqueous glycerol solution, and an aqueous potassium iodide solution.

Means and conditions for bringing the hydrophilic polymer film into contact with the swelling liquid in a case where the width direction stretching process is carried out in this process are the same as those employed in the case of the width direction stretching process.

In a case where the width direction stretching process is not carried out (for example, non-stretching treatment, the same applies below) in this process, the contact with the swelling liquid may be carried out by, for example, immersing the hydrophilic polymer film in the swelling liquid. In this case, a swelling bath is used. In this case, the time for immersing the hydrophilic polymer film in the swelling liquid (swelling bath) is not particularly limited however is, for example, in the range of 20 to 300 seconds, preferably in the range of 30 to 200 seconds, and more preferably in the range of 30 to 120 seconds. The temperature of the swelling liquid (swelling bath) is, for example, in the range of 20 to 45° C., preferably in the range of 25 to 40° C., and more preferably in the range of 27 to 37° C.

(4) Dyeing Process

Next, the hydrophilic polymer film that has been swollen is brought into contact with a dyeing liquid containing a dichroic material.

A conventionally known material can be used as the dichroic material. Examples thereof include iodine and organic dyes. When the organic dyes are used, it is preferable that at least two types are combined from the viewpoint of, for example, neutralization of a visible light region.

A solution containing the dichroic material dissolved in a solvent can be used as the dyeing liquid. The solvent to be used herein can be, for example, water, and an organic solvent that is compatible with water also may be added. The concentration of the dichroic material in the solution is not particularly limited however is, for example, in the range of 0.005 to 0.40% by weight and preferably in the range of 0.01 to 0.30% by weight.

When iodine is used as the dichroic material, it is preferable that an iodide also be added as an auxiliary agent in addition to iodine since it can further improve the solubility and the dyeing efficiency. Examples of the iodide include potassium iodide, lithium iodide, sodium iodide, zinc iodide, aluminum iodide, lead iodide, copper iodide, barium iodide, calcium iodide, tin iodide, and titanium iodide. The ratio of such iodide to be added is preferably in the range of 0.05 to 10% by weight and more preferably in the range of 0.10 to 5% by weight in the dyeing liquid.

For instance, when iodine and potassium iodide are used in combination, the ratio (A:B (weight ratio)) between iodine (A) and potassium iodide (B) in the solution is, for example, in the range of 1:5 to 1:100, preferably in the range of 1:7 to 1:50, and more preferably in the range of 1:10 to 1:30.

Means and conditions for bringing the hydrophilic polymer film into contact with the dyeing liquid in a case where the width direction stretching process is carried out in this process are the same as those employed in the case of the width direction stretching process.

In a case where the width direction stretching process is not carried out in this process, the contact with the dyeing liquid may be carried out by, for example, immersing the hydrophilic polymer film in the dyeing liquid. In this case, a dyeing bath is used. In this case, the time for immersing the hydrophilic polymer film in the dyeing liquid (dyeing bath) is not particularly limited however is, for example, in the range of 10 to 90 seconds, preferably in the range of 15 to 60 seconds, and more preferably in the range of 20 to 45 seconds. The temperature of the dyeing liquid (dyeing bath) is, for example, in the range of 5 to 42° C., preferably in the range of 10 to 35° C., and more preferably in the range of 12 to 30° C.

(5) Crosslinking Process

Next, the hydrophilic polymer film that has been subjected to the dyeing treatment is brought into contact with a crosslinking liquid containing a crosslinker.

A conventionally known material can be used as the crosslinker. Examples thereof include boron compounds such as boric acid and borax. One of these may be used alone or two or more of them may be used in combination. A solution containing the crosslinker dissolved in a solvent can be used as the crosslinking liquid. For instance, water can be used as the solvent, and further an organic solvent that is compatible with water may be contained.

The concentration of the crosslinker in the solution is not particularly limited. For example, it is preferably in the range of 0.1 to 10 parts by weight, more preferably in the range of 1.5 to 8 parts by weight, and further preferably in the range of 2 to 6 parts by weight, with respect to 100 parts by weight of the solvent (for example, water).

From the viewpoint that uniform in-plane properties of a polarizer can be obtained, the crosslinking liquid may contain an auxiliary agent, for example, an iodide such as potassium iodide, lithium iodide, sodium iodide, zinc iodide, aluminum iodide, lead iodide, copper iodide, barium iodide, calcium iodide, tin iodide, or titanium iodide in addition to the boron compound. Among these, a combination of boric acid and potassium iodide is preferable. The content of the auxiliary agent in the solution is, for example, in the range of 0.05 to 15% by weight and preferably in the range of 0.5 to 8% by weight.

Means and conditions for bringing the hydrophilic polymer film into contact with the crosslinking liquid in a case where the width direction stretching process is carried out in this process are the same as those employed in the case of the width direction stretching process.

In a case where the width direction stretching process is not carried out in this process, the contact with the crosslinking liquid may be carried out by, for example, immersing the hydrophilic polymer film in the crosslinking liquid. In this case, a crosslinking bath is used. In this case, the time for immersing the hydrophilic polymer film in the crosslinking liquid (crosslinking bath) is not particularly limited however is, for example, in the range of 5 to 150 seconds, preferably in the range of 10 to 90 seconds, and more preferably in the range of 20 to 40 seconds. The temperature of the crosslinking liquid (crosslinking bath) is, for example, in the range of 20 to 70° C. and preferably in the range of 40 to 60° C.

(6) Conditioning and Drying Process

Finally, the hydrophilic polymer film is brought into contact with an iodide-containing aqueous solution (conditioning liquid) and is then dried. Thus a polarizer of the present invention is obtained.

The iodide that can be used in the iodide-containing aqueous solution can be one of those described above and particularly, for example, potassium iodide or sodium iodide is preferable. This iodide-containing aqueous solution can wash away remaining boric acid used in the stretching process from the hydrophilic polymer film.

When the aqueous solution is an aqueous potassium iodide solution, the concentration thereof is, for example, in the range of 0.5 to 20% by weight, preferably in the range of 1 to 15% by weight, and more preferably in the range of 1.5 to 7% by weight.

Means and conditions for bringing the hydrophilic polymer film into contact with the conditioning liquid in a case where the width direction stretching process is carried out in this process are the same as those employed in the case of the width direction stretching process.

In a case where the width direction stretching process is not carried out in this process, the contact with the conditioning liquid may be carried out by, for example, immersing the hydrophilic polymer film in the conditioning liquid. In this case, a conditioning bath is used. In this case, the time for immersing the hydrophilic polymer film in the conditioning liquid (conditioning bath) is not particularly limited however is, for example, in the range of 2 to 15 seconds, and preferably in the range of 3 to 12 seconds,. The temperature of the conditioning liquid (conditioning bath) is, for example, in the range of 15 to 40° C., and preferably in the range of 20 to 35° C.

The drying is not particularly limited and examples thereof include natural drying, air drying, drying by heating, or the like. In the case of drying by heating, the temperature is preferably in the range of 25 to 60° C., more preferably in the range of 30 to 50° C., and further preferably in the range of 30 to 45° C.

The swelling process, dyeing process, crosslinking process, width direction stretching process, and conditioning and drying process have been described above. These processes may be carried out separately or the processes that can be combined into one process may be carried out together. Furthermore, the conditioning and drying process may be carried out after every process.

The polarizer of the present invention can be manufactured through such a series of processes. The polarizer of the present invention is manufactured as a long length film having an absorption axis in the width direction of the film, for example. The polarizer of the present invention may be used for, for example, manufacturing the optical film or the composite polarizing plate of the present invention described later. Further, the polarizer of the present invention may be used by cutting into a predetermined size, for example.

(7) Spraying of Liquid in Method of Manufacturing Polarizer of the Present Invention As described above, in the method of manufacturing a polarizer of the present invention, it is preferable that each process of swelling, crosslinking, dyeing, width direction stretching, conditioning, and the like is carried out while the hydrophilic polymer film being in contact with each treatment liquid of the aforementioned processes, and at least one of the contact with the liquid in the aforementioned processes is carried out in a gas phase by spraying the liquid onto at least one surface of the hydrophilic polymer film. Preferably in this case, the process, in which the contact with the liquid is performed by spraying, is carried out while feeding the hydrophilic polymer film in a longitudinal direction, and the spraying is carried out in a space in which the sprayed liquid is prevented from being leaked to an external environment by a leak preventing means. In a case where the contact with the liquid is carried out by spraying, some of liquid mist generated by spraying is not brought into contact with the hydrophilic polymer film but dispersed by air currents. In this state, spraying in the aforementioned space, in which the sprayed liquid is prevented from being leaked, makes it possible to significantly reduce the leak of the dispersed liquid to the external environment and to easily collect the dispersed liquid. As a result, damage to the health of workers is prevented because of the ease of collection of the dispersed liquid and the reuse and disposal of the liquid after collection.

As described above, examples of the leak preventing means include a spray booth, and the like. Preferably, the spray booth has a carrying-in entrance and a carrying-out exit of the hydrophilic polymer film. In this state, it is more preferable that the pressure in the spray booth is negative to the outside (to make the pressure in the spray booth lower than the pressure of the outside). Thereby, air current from the outside to the inside of the spray booth is generated, and the leak of the dispersed liquid to the outside environment from the carrying-in entrance and the carrying-out exit is efficiently prevented. The pressure in the spray booth can be decided suitably according to the pressure of the outside. The difference (P1−P2) between the pressure in the spray booth (P1) and the pressure of the outside (P2) is, for example, in the range of −0.05 to −50 Pa and preferably in the range of −0.5 to −20 Pa. Means for making the pressure in the spray booth being negative is not particularly limited, however an arbitrary pressure reducing device such as a vacuum pump, an exhaust fan, and the like can be used.

Figure 4:
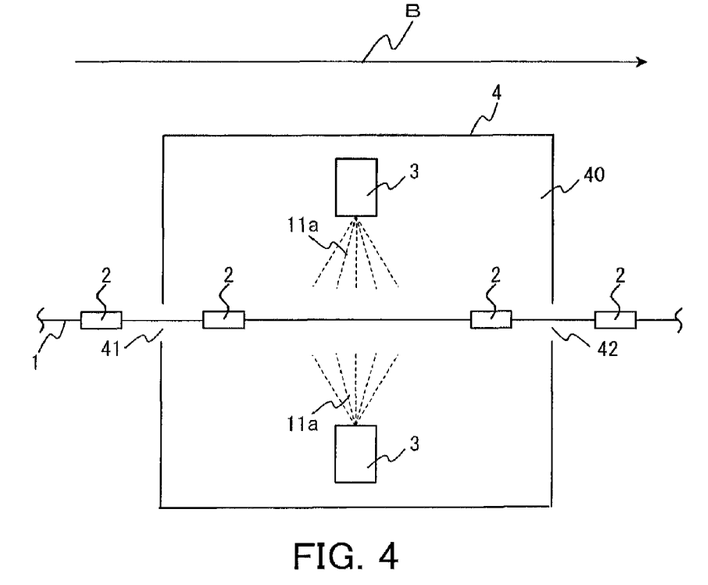
FIG. 4 is a schematic view showing an example of spraying of liquid in a manufacturing method of a polarizer of the present invention.

The spraying of the liquid is explained with a non-limiting example of the width direction stretching process. The spraying of the liquid in this example is schematically shown in FIG. 4. In FIG. 4, identical parts to those shown in FIGS. 1 to 3 are indicated with identical numerals and symbols. As shown in FIG. 4, in this example, the leak preventing means is a box shaped spray booth 4 having a carrying-in entrance 41 and a carrying-out exit 42 of a hydrophilic polymer film 1. In the spraying of the liquid in this example, similar to those explained in the case of the width direction stretching means, both ends in a width direction of the hydrophilic polymer film 1, which is continuously supplied, are gripped with grip means 2. Further, the grip means 2 are moved in a longitudinal direction of the hydrophilic polymer film 1 (a rightward direction in FIG. 4). Thereby, as indicated by an arrow B, the hydrophilic polymer film 1 is fed in a longitudinal direction thereof (a rightward direction in FIG. 4). Accordingly, the hydrophilic polymer film 1 is fed in the spray booth 4 from the carrying-in entrance 41. In the spray booth 4, a spray nozzle 3 of a spray device is disposed that is similar to those explained in the case of the width direction stretching means. Together with the feeding, in the spray booth 4, liquid 11a is sprayed onto both surfaces of the hydrophilic polymer film 1 by the spray nozzle 3. Further, at the time of this feeding, as described above, the hydrophilic polymer film 1 is stretched in the width direction by also moving the grip means 2, which grips at least one of both ends in the width direction of the hydrophilic polymer film 1, outwardly in the width direction of the hydrophilic polymer film 1. Finally, the hydrophilic polymer film 1 is discharged from the carrying-out exit 42. Of the liquid mist generated by the spraying, liquid that is dispersed without being in contact with the hydrophilic polymer film 1 can easily be collected from a bottom portion of the spray booth 4. Further, when the pressure of the inside of the spray booth 4 is negative to the pressure of the outside, air current from the outside to the inside of the spray booth 4 is generated, and the leak of the liquid dispersed from the carrying-in entrance 41 and the carrying-out exit 42 can efficiently be prevented. FIG. 4 shows a case in which the liquid 11a is sprayed onto both surfaces of the hydrophilic polymer film 1 by the spray nozzle 3. However, the present invention is not limited thereto, and the liquid 11a may be sprayed onto only one surface of the hydrophilic polymer film 1.

Shape of the spray booth is not particularly limited. For example, the spray booth may have a box shape as shown in FIG. 4 or an upper portion of the spray device may be a hemispherical dome. A material of a wall of the spray booth is not particularly limited. However, a material that has sufficient resistance to the liquid is preferable.

At the bottom portion of the spray booth, a suction device for collecting the dispersed liquid may be provided. Preferably, the suction device, which can simultaneously suck air of the inside of the spray booth in addition to the dispersed liquid, is used. Use of such suction device makes it possible to collect the dispersed liquid and to make the pressure of the inside of the spray booth negative, at the same time.

Further, although this example is explained by taking the width direction stretching means as an example, the present invention is not limited thereto. For example, also in a case where the hydrophilic polymer film is fed by a roll without performing the width direction stretching, the aforementioned each process can be carried out by forming a space in which the leak of the liquid is prevented.

Figure 5:
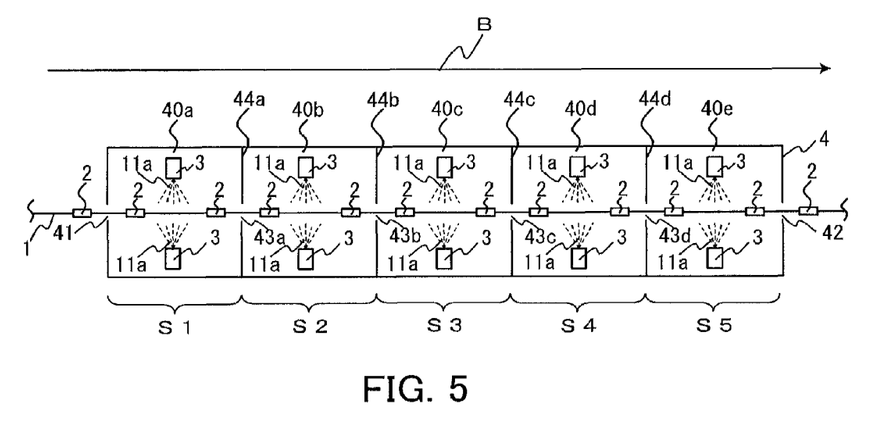
FIG. 5 is a schematic view showing an example of spraying of liquid in a manufacturing method of a polarizer of the present invention in a case where plural processes are provided, in which contact of liquid is carried out by spraying.

When there is a plurality of processes, in which the contact with the liquid is carried out by spraying, the space where the leak of the liquid is prevented is preferably formed in every process that has a different liquid composition. FIG. 5 schematically shows an example of the spraying in this case. In FIG. 5, identical parts to those shown in FIG. 4 are indicated with identical numerals and symbols. As shown in FIG. 5, in this example, manufacture of a polarizer is carried out by in order of a swelling process S1, a dyeing process S2, a crosslinking process S3, a width direction stretching process S4, and a conditioning process S5. In the aforementioned all processes, the contact with the liquid is carried out by spraying. The spray booth 4 includes partition plates 44a to 44d, on which carrying-in entrances 43a to 43d of the hydrophilic polymer film 1 are formed, between adjacent each process. The swelling process S1 and the dyeing process S2 are separated by the separation plate 44a, the dyeing process S2 and the crosslinking process S3 are separated by the separation plate 44b, the crosslinking process S3 and the width direction stretching process S4 are separated by the separation plate 44c, and the width direction stretching process S4 and the conditioning process S5 are separated by the separation plate 44d. Spaces 40a to 40e, in which the leak of the liquid is prevented, are formed in every process by the separation plates 44a to 44d. Thereby, the treatment liquid of each process can separately be collected. Further, an environmental temperature can be optimized by each process. In a case where composition of the treatment liquid of the adjacent processes is same, the separation plate therebetween may not be provided. Further, instead of the separation plates, the spray booth may individually be provided by each process.

FIG. 5 shows a case in which the hydrophilic polymer film 1 is fed by the grip means 2 in the all processes. However, the present invention is not limited thereto. For example, excluding the width direction stretching process S4, in the swelling process S1, the dyeing process S2, the crosslinking process S3, and the conditioning process S5, the hydrophilic polymer film 1 may be fed by a roll and the treatment liquid of each process may be sprayed in the space in which the leak of the liquid is prevented.

In the spraying of the liquid, for example, as shown in FIGS. 4 and 5, a feeding direction of the hydrophilic polymer film 1 (arrow B) is a horizontal direction, and the spray nozzles 3 are arranged at both of an upper side and a lower side of the hydrophilic polymer film 1. However, the present invention is not limited thereto. The spray nozzles may be arranged only at the upper side of the hydrophilic polymer film 1 or only at the lower side of the hydrophilic polymer film 1.

(8) Polarizer

The thickness of the polarizer of the present invention is not particularly limited however is, for example, in the range of 5 to 40 µm, preferably in the range of 10 to 37 µm, and more preferably in the range of 15 to 35 µm.

(9) Polarizing Plate

A polarizing plate of the present invention has a structure in which a protective layer is laminated on at least one surface of the polarizer of the present invention. The protective layer may be laminated on only one surface or both surfaces of the polarizer. When being laminated on both surfaces, for example, the same type of protective layers may be used or different types of protective layers may be used.

Figure 6:
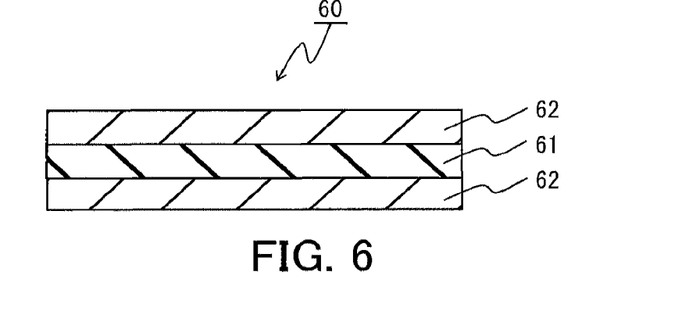
FIG. 6 is a sectional view showing an example of a structure of a polarizing plate of the present invention.

FIG. 6 shows a sectional view of an example of the polarizing plate of the present invention. As shown in FIG. 6, this polarizing plate 60 includes protective layers 62 laminated on both surfaces of a polarizer 61.

The protective layer 62 is not particularly limited and a conventionally known protective film can be used. It is preferably one that is excellent in, for example, transparency, mechanical strength, thermal stability, moisture barrier properties, and isotropy. Specific examples of the material for such a protective layer include cellulose resins such as triacetylcellulose (TAC), as well as polyester-based, polycarbonate-based, polyamide-based, polyimide-based, polyethersulfone-based, polysulfone-based, polystyrene-based, acrylic-based, acetate-based, and polyolefin-based resins. Further examples include the aforementioned acrylic-based, urethane-based, acrylic urethane-based, epoxy-based, and silicone-based thermosetting resins and ultraviolet-curing resins.

In addition, for example, a film also can be used that is formed of an extruded mixture of a resin composition containing an acrylonitrile-styrene copolymer and an alternating copolymer composed of isobutene and N-methylmaleimide as described in JP 2001-343529 A or WO 01/37007.

Furthermore, such a protective film may have, for example, surfaces saponified with, for instance, an alkali. Particularly, a TAC film is preferable in view of, for example, polarization properties and durability, and a TAC film with surfaces that have been saponified is more preferable.

The thickness of the protective layer is, for example, in the range of 1 to 500 µm, preferably in the range of 5 to 200 µm, and more preferably in the range of 10 to 150 µm.

It is preferable that the protective layer to be used have an optimized phase difference value. The use of such a protective layer does not affect the viewing angle characteristics of an image display.

With respect to the phase difference value of the protective layer, the in-plane phase difference value (Re) of the film is preferably in the range of 0 to 5 nm, more preferably in the range of 0 to 3 nm, and further preferably in the range of 0 to 1 nm, and the phase difference value (Rth) in the direction of the film thickness is preferably in the range of 0 to 15 nm, more preferably in the range of 0 to 12 nm, further preferably in the range of 0 to 5 nm, and most preferably in the range of 0 to 3 nm.

The protective layer can be formed suitably by a conventionally known method such as a method of applying the aforementioned various transparent resins to a polarizer or a method of laminating, for example, films made of the aforementioned resins on the polarizer. Furthermore, commercially available products also can be used.

Moreover, the protective layer further may have been subjected to, for example, a hard-coating treatment, an antireflection treatment, an antisticking treatment, or a treatment carried out for the purpose of, for example, diffusion or antiglare.

For the method of bonding the polarizer and the protective layer, for example, a pressure sensitive adhesive and other adhesives are used and the type thereof can be determined suitably according to, for instance, the type of the polarizer or the protective layer. The thickness of the adhesive layer or pressure sensitive adhesive layer is not particularly limited however is, for example, in the range of 1 to 500 nm, preferably in the range of 10 to 300 nm, and more preferably in the range of 20 to 100 nm.

Figure 7:
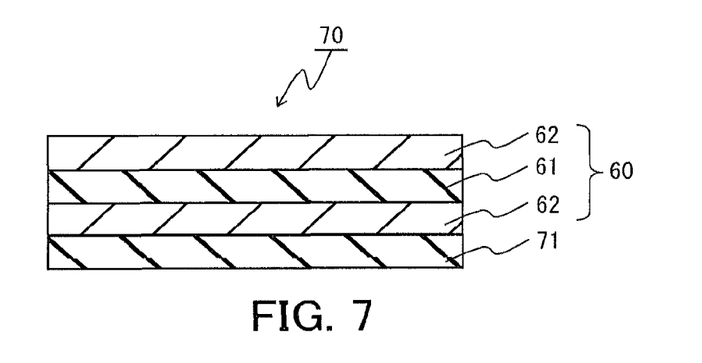
FIG. 7 is a sectional view showing another example of a structure of a polarizing plate of the present invention.

Preferably, the polarizing plate of the present invention further has a pressure sensitive adhesive layer as its outermost layer because it facilitates laminating the polarizing plate on, for example, a liquid crystal cell. FIG. 7 shows a sectional view of a polarizing plate having such a pressure sensitive adhesive layer. In FIG. 7, the parts identical to those shown in FIG. 6 are indicated with identical numerals and symbols. As shown in FIG. 7, the polarizing plate 70 has a structure in which a pressure sensitive adhesive layer 71 further is disposed on the surface of one of the protective layers 62 of the polarizing plate 60.

The pressure sensitive adhesive layer can be formed on the surface of the protective layer by, for example, a method in which a solution or melt of a pressure sensitive adhesive is applied directly to a predetermined surface of the protective layer to form a layer by a development method such as casting or coating, or a method in which a pressure sensitive adhesive layer is formed on the separator described later in the same manner and is then transferred and allowed to adhere to a predetermined surface of the protective layer. Such a pressure sensitive adhesive layer may be formed on either one of the surfaces of the polarizing plate as shown in FIG. 7 described above however is not limited thereto. Pressure sensitive adhesive layers may be disposed on both the surfaces as required.

The pressure sensitive adhesive layer can be formed by suitably using a conventionally known pressure sensitive adhesive, for example, an acrylic-based, silicone-based, polyester-based, polyurethane-based, polyether-based, or rubber-based pressure sensitive adhesive. Preferably, the surface of the pressure sensitive adhesive layer is covered with a separator for the purpose of, for example, contamination control. The separator can be formed by, for example, a method in which a release coating formed of a silicone-based, long-chain alkyl-based, fluorine-based, or molybdenum sulfide release agent is provided for a thin layer film such as the protective film as required.

The thickness of the pressure sensitive adhesive layer is not particularly limited and is, for example, in the range of 5 to 35 µm, preferably in the range of 10 to 25 µm, and more preferably in the range of 15 to 25 µm.

(10) Optical Film

Next, the optical film of the present invention includes a retardation film laminated on at least one of a surface of the polarizer of the present invention or a surface of the polarizing plate of the present invention.

The retardation film may be a film having a phase difference suitably according to intended use. For example, various wavelength plates such as a 1/2λ plate, a 1/4λ plate, and the like; a film for compensating coloration due to birefringence of a liquid crystal layer; a film for compensating a viewing angle such as a view expansion; and the like may be used. Further, an incline-oriented film, in which a refractive index in a thickness direction is controlled, may be used. Moreover, a laminated body may be used, in which two or more of the retardation films are laminated and an optical characteristic such as a phase difference is controlled.

Examples of the material of the retardation film include a birefringent film which is obtained by stretching a polymer film such as polycarbonate, PVA, polystyrene, polymethylmethacrylate, polypropylene and other polyolefin, polyarylate, polyamide, polynorbornene, and the like; an oriented film of a liquid crystal polymer; a laminated body in which an oriented layer of a liquid crystal polymer is supported by a film; and the like.

The incline-oriented film can be obtained, for example, by a method in which a heat-shrinkable film is bonded to a polymer film to apply a stretching treatment or a shrinkage treatment to the polymer film under a shrinkage force due to heat; a method in which a liquid crystal polymer is obliquely orientated; and the like.

A self prepared retardation film or a commercially available retardation film may be used.

The optical film of the present invention can be manufactured in the same manner as described in the method of manufacturing the composite polarizing plate of the present invention except that the retardation film is used instead of the reflective polarizer, for example. However, the optical film of the present invention is not limited thereto, and the optical film manufactured by other methods may be used.

(11) Composite Polarizing Plate

The composite polarizing plate of the present invention includes a polarizing plate and a reflective polarizer. The composite polarizing plate of the present invention is manufactured as follows.

That is, first, a long length film polarizing plate having an absorption axis in a width direction of the film and including a polarizer of the present invention is prepared. As described above, for example, the polarizer of the present invention is manufactured as a continuous film having an absorption axis in a width direction of the film. Use of this makes it possible to prepare the polarizing plate without difficulty. Any polarizing plate can be used as long as it includes the polarizer of the present invention. The polarizing plate may be a polarizing plate of the present invention including a protective layer laminated on at least one surface of a polarizer of the present invention. However, the polarizing plate applied to the composite polarizing plate of the present invention is not limited thereto and may not include the protective layer. Preferably, the polarizer is prepared in the form of winding around a roll.

Next, a long length film reflective polarizer having a reflective axis in a width direction of the film is prepared. As the reflective polarizer, for example, an arbitrary suitable film can be adopted which separates linear polarized light from natural light or polarized light. An example of the film which separates the linear polarized light includes a film which transmits one of linear polarized lights orthogonal in the axis direction and reflects the other. Specific examples of such reflective polarizer include a multilayer thin film laminated body of more than one layer made of more than one material having refractive index difference; a polarizer obtained by stretching a resin laminated body of more than one layer using more than one resin having refractive index difference; and the like. More specifically, for example, as the reflective polarizer, a polarizer obtained by uniaxially stretching a multilayer laminated body may be used. The multilayer laminated body is obtained by alternately laminating a material that expresses a phase difference by stretching (for example, polyethylene naphthalate, polyethylene terephthalate (PET), and polycarbonate) or an acrylic resin (for example, polymethylmethacrylate) with a resin that has few phase difference expression (for example, norbornene resin such as "ARTON" (trade name) series manufactured by JSR Corporation). Further, a commercially available reflective polarizer having a birefringent multilayer structure (for example, "DBEF" (trade name) manufactured by 3M) may be used. The thickness of the reflective polarizer is not particularly limited, however is, for example in the range of 50 to 200 µm. Preferably the reflective polarizer is also prepared in the form of winding around a roll.

Next, the polarizing plate and the reflective polarizer are bonded while feeding them in a longitudinal direction of the film, respectively. The polarizing plate and the reflective polarizer are not particularly limited, however they are preferably fed in the longitudinal direction of the film by plural rolls. For example, a pressure sensitive adhesive and other adhesives are used for bonding the polarizing plate and the reflective polarizer, and types of the pressure sensitive adhesive and other adhesives are decided suitably according to types of the polarizing plate and the reflective polarizer. The thickness of the adhesive layer and the pressure sensitive adhesive layer is not particularly limited, however is, for example, in the range of 1 to 50 µm and preferably in the range of 2 to 30 µm.

In this manner, the composite polarizing plate of the present invention can be manufactured. Normally, the composite polarizing plate of the present invention is used by cutting into a predetermined size.

Figure 8:
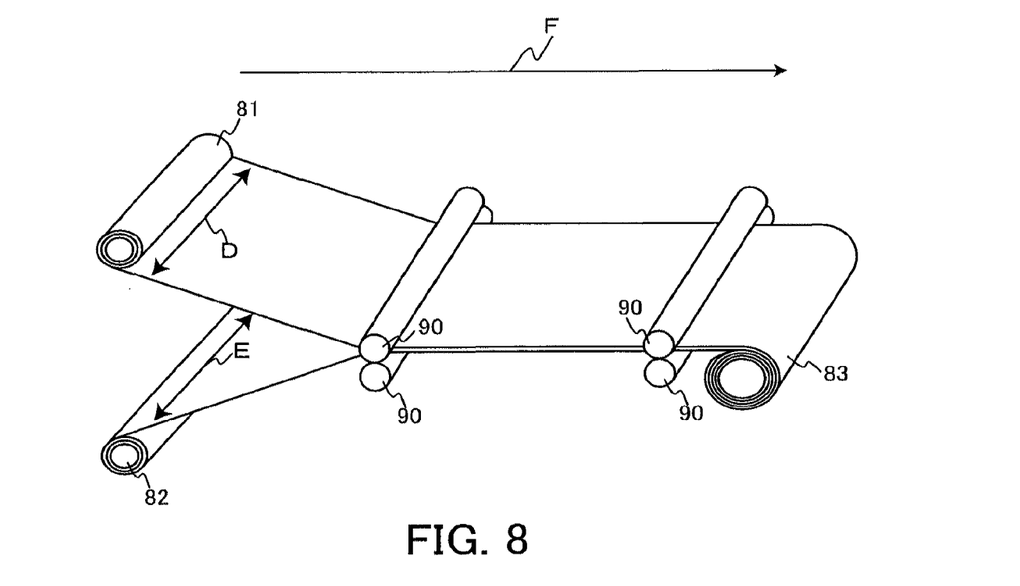
FIG. 8 is a schematic view showing an example of a manufacturing method of a composite polarizing plate of the present invention.

FIG. 8 schematically shows an example of a manufacturing method of a composite polarizing plate of the present invention. As shown in FIG. 8, in this example, a long length film polarizing plate 81 and a long length film reflective polarizer 82 which are respectively wound around a roll are bonded while respectively feeding in a longitudinal direction of the film indicated by an arrow F by four rolls 90. The polarizing plate 81 has an absorption axis in a width direction of the film as indicated by an arrow D. Further, the reflective polarizer 82 has a reflective axis in a width direction of the film as indicated by an arrow E. The aforementioned bond of the polarizing plate 81 and the reflective polarizer 82 makes it possible to obtain a composite polarizing plate 83 in which the absorption axis of the polarizing plate 81 is parallel to the reflective axis of the reflective polarizer 82. In this example, the composite polarizing plate 83 is collected by winding around a roll.

In this manner, according to the present invention, the composite polarizing plate can continuously be manufactured. In other words, according to the manufacturing method of the composite polarizing plate of the present invention, as described above, the number of processes is reduced and a brief manufacturing can be achieved. Further, manufacturing processes are simple and improved in yield.

(12) Applications

The polarizer, polarizing plate, the optical film, and the composite polarizing plate of the present invention can be used preferably for various image displays such as a liquid crystal display (LCD) and an EL display (ELD). The image display of the present invention has the same configuration as that of a conventional image display except that at least one of the polarizer, the polarizing plate, the optical film, and the composite polarizing plate of the present invention is used. A liquid crystal display including, for example, a polarizer of the present invention used therein can be manufactured by, for example, suitably assembling respective components such as liquid crystal cells, optical elements such as a polarizer of the present invention, and if necessary, a lighting system (for example, a backlight), and incorporating a drive circuit thereinto.

The image display of the present invention is used for suitable arbitrary applications. Examples of the applications include office automation equipment such as a desktop personal computer, a notebook personal computer, and a copier, portable devices such as a cell-phone, a watch, a digital camera, a personal digital assistant (PDA), and a hand-held game device, home appliances such as a video camera, a television set, and a microwave oven, car equipment such as a back monitor, a monitor for car navigation system, and a car audio system, display equipment such as information monitors for commercial shops, security equipment such as surveillance monitors, and care and medical equipment such as a monitor for care and a monitor for medical use.

EXAMPLES

Next, examples of the present invention are described together with comparative examples. The present invention is not limited by the following Examples or Comparative Examples. The measurement of a phase difference value (Δnd) in Example and Comparative Example was carried out by the following method.

(Phase Difference Value (Δnd))

A phase difference value (Δnd) was measured using "KOBRA31×100/IR" (trade name) manufactured by Oji Scientific Instruments.

Example 1

<Preparation of PVA Film>

An original PVA film ("VF-PS" (trade name), manufactured by Kuraray Co., Ltd.) was prepared. This PVA film had a thickness of 75 μm. The following each process was carried out while gripping both ends of the PVA film in a width direction thereof by tenter clips (grip means) and feeding the PVA film in a longitudinal direction thereof using a tenter stretching machine. The length of a grip range by the tenter clips (grip means) was 14 mm and the width of the grip range by the tenter clips (grip means) was 19 mm. Further, the distance between the tenter clips (grip means), which are adjacent in a longitudinal direction of the PVA film, was 10 mm.

<Production of Polarizer>

(1) Swelling Process

In the gas phase, water (a swelling liquid) of a room temperature (23° C.) was sprayed onto one surface of the PVA film for 30 seconds. In this state, a line was imaged that connects inner ends of the tenter clips (grip means) in a width direction of the PVA film, the grip means being adjacent in a longitudinal direction of the PVA film, and a region inside of the virtual line was brought into contact with the swelling liquid and a region outside of the virtual line was not brought into contact with the swelling liquid. Further, the distance between a spray nozzle and the PVA film was 20 cm, and the amount of the dyeing liquid sprayed onto the PVA film was 0.06 mL/cm$^2$.

(2) Dyeing Process

In the gas phase, an aqueous solution (a dyeing liquid) of a room temperature (23° C.) containing 0.2% by weight of iodine was sprayed for 27 seconds onto one surface of the PVA film that has been swollen. In this state, a line was imaged that connects inner ends of the tenter clips (grip means) in a width direction of the PVA film, the grip means being adjacent in a longitudinal direction of the PVA film, and a region inside of the virtual line was brought into contact with the dyeing liquid and a region outside of the virtual line was not brought into contact with the dyeing liquid. Further, the distance between a spray nozzle and the PVA film was 20 cm, and the amount of the crosslinking liquid sprayed onto the PVA film was 0.06 mL/cm$^2$.

(3) Crosslinking Process

In the gas phase, an aqueous solution (a crosslinking liquid) of a room temperature (23° C.) containing 3% by weight of boric acid and 3% by weight of potassium iodide was sprayed for 8 seconds onto one surface of the PVA film that has been dyed. In this state, a line was imaged that connects inner ends of the tenter clips (grip means) in a width direction of the PVA film, the grip means being adjacent in a longitudinal direction of the PVA film, and a region inside of the virtual line was brought into contact with the crosslinking liquid and a region outside of the virtual line was not brought into contact with the crosslinking liquid. Further, the distance between a spray nozzle and the PVA film was 20 cm, and the amount of the swelling liquid sprayed onto the PVA film was 0.06 mL/cm$^2$.

(4) Width Direction Stretching Process

While spraying an aqueous solution (a stretching liquid) of a room temperature (23° C.) containing 4% by weight of boric acid and 5% by weight of potassium iodide onto one surface of the PVA film that has been crosslinked in the gas phase, the PVA film was stretched in a width direction thereof so that the length of the PVA film becomes 2.64 times with respect to the length of the original film of before stretching. In this state, a line was imaged that connects inner ends of the tenter clips (grip means) in a width direction of the PVA film, the grip means being adjacent in a longitudinal direction of the PVA film, and a region inside of the virtual line was brought into contact with the stretching liquid and a region outside of the virtual line was not brought into contact with the stretching liquid. Further, the distance between a spray nozzle and the PVA film was 20 cm, and the amount of the stretching liquid sprayed onto the PVA film was 0.06mL/cm$^2$.

(5) Conditioning and Drying Process

In the gas phase, an aqueous solution (a conditioning liquid) of a room temperature (23° C.) containing 3% by weight of potassium iodide was sprayed for 10 seconds onto one surface of the PVA film that has been stretched. In this state, a line was imaged that connects inner ends of the tenter clips (grip means) in a width direction of the PVA film, the grip means being adjacent in a longitudinal direction of the PVA film, and a region inside of the virtual line was brought into contact with the conditioning liquid and a region outside of the virtual line was not brought into contact with the conditioning liquid. Further, the distance between a spray nozzle and the PVA film was 20 cm, and the amount of the conditioning liquid sprayed onto the PVA film was 0.06 mL/cm$^2$. Subsequently, this PVA film was dried at 60° C. for 4 minutes and thereby obtained a polarizer of this Example.

Comparative Example 1

<Preparation of PVA Film>

An original PVA film was prepared in the same manner as in Example 1.

<Production of Polarizer>

(1) Swelling Process

The PVA film was immersed in a water bath (a swelling bath) of 30° C. for 30 seconds.

(2) Dyeing Process

The PVA film that has been swollen was immersed in an aqueous solution (a dyeing bath) of 30° C. containing 0.03% by weight of iodine for 27 seconds.

(3) Crosslinking Process

The PVA film that has been dyed was immersed in an aqueous solution (a crosslinking bath) of 30° C. containing 3% by weight of boric acid and 3% by weight of potassium iodide for 8 seconds.

(4) Width Direction Stretching Process

In a condition where the PVA film that has been crosslinked was immersed in an aqueous solution (a stretching bath) of 60° C. containing 4% by weight of boric acid and 5% by weight of potassium iodide, using a tenter stretching machine, the PVA film was stretched in a width direction thereof so that the length thereof becomes 2.64 times with respect to the length of the original PVA film before stretching. In the tenter stretching, the length of a grip range by the tenter clips (grip means) was 14 mm and the width of the grip range by the tenter clips (grip means) was 19 mm. Further, the distance between the tenter clips (grip means), which are adjacent in a longitudinal direction of the PVA film, was 10 mm.

(5) Conditioning and Drying Process

The PVA film that has been stretched was immersed in an aqueous solution (a conditioning liquid) of 30° C. containing 3% by weight of potassium iodide for 10 seconds. Subsequently, this PVA film was dried at 60° C. for 4 minutes and thereby obtained the polarizer of this Comparative Example.

Figure 9:
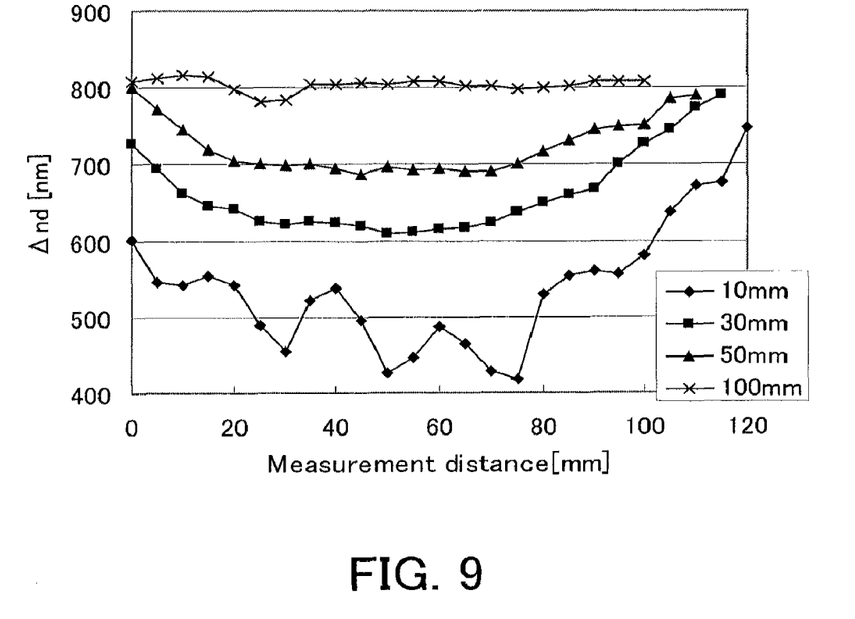
FIG. 9 is a graph showing measurement results of phase difference values (Δnd) in Example of the present invention.
Figure 10:
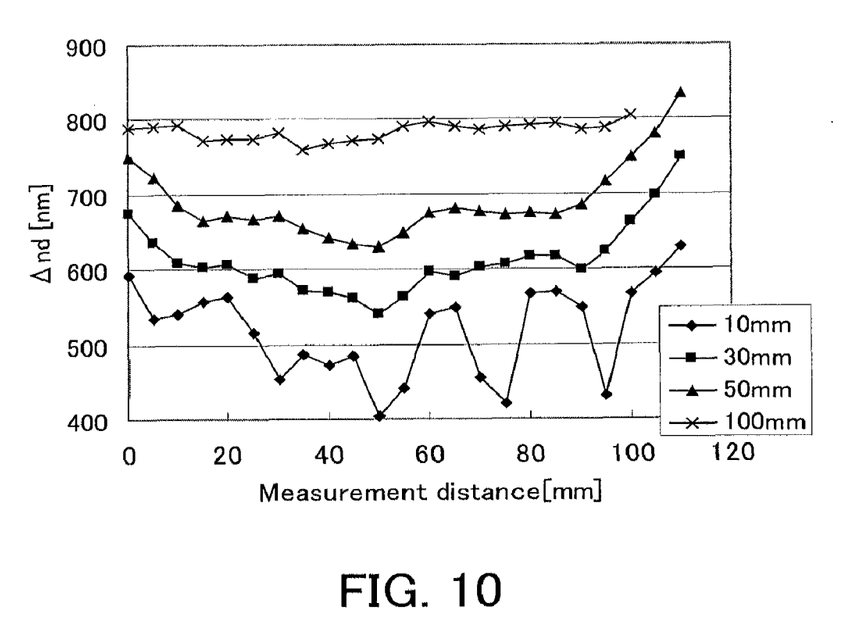
FIG. 10 is a graph showing measurement results of phase difference values (Δnd) in Comparative Example of the present invention.
Figure 11:
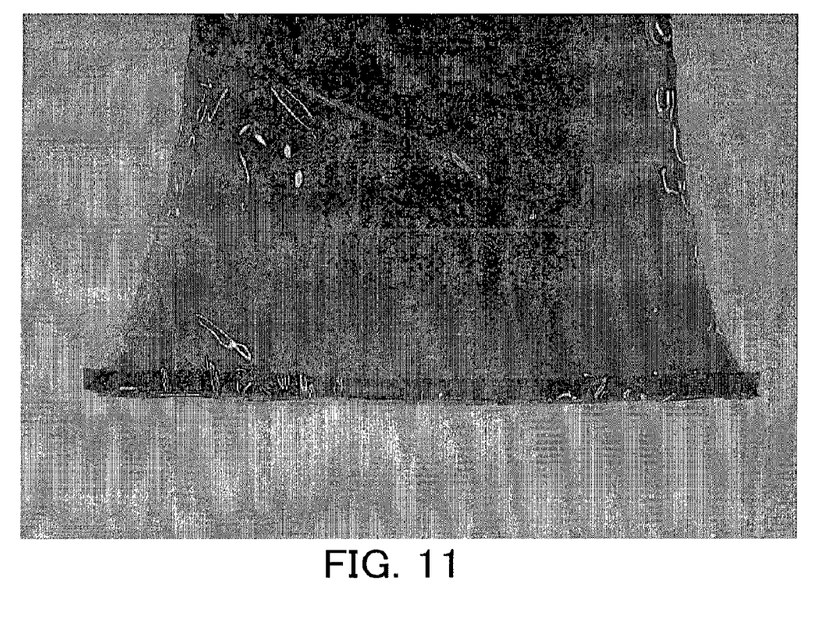
FIG. 11 is a photograph of a polarizer of Example of the present invention.
Figure 12:
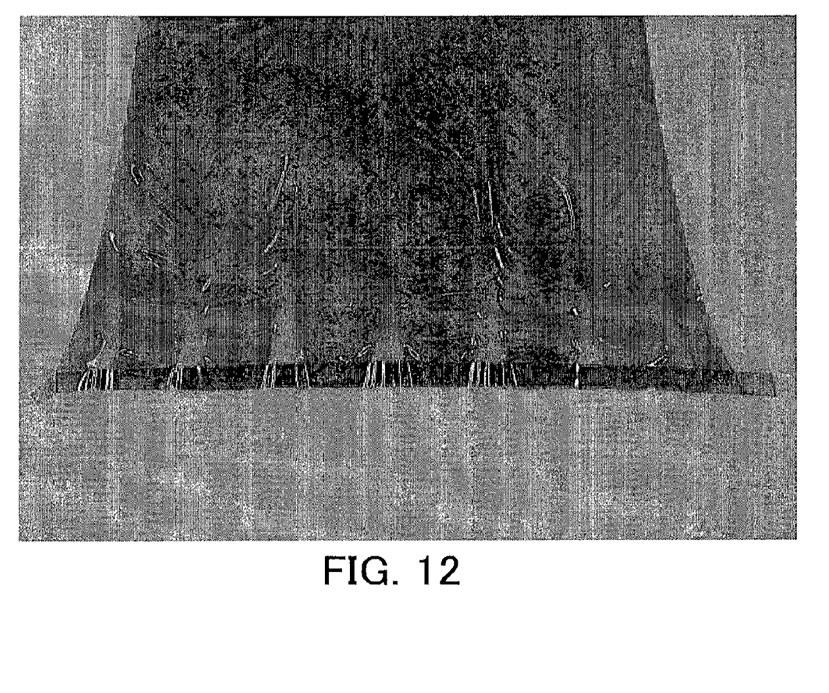
FIG. 12 is a photograph of a polarizer of Comparative Example of the present invention.

With respect to the polarizer of Example 1 and Comparative Example 1, a line was imaged that connects inner ends of the tenter clips (grip means) in a width direction of the PVA film, the grip means being adjacent in a longitudinal direction of the PVA film, and a phase difference value (Δnd) at an inside of the virtual line by a predetermined distance (10 mm, 30 mm, 50 mm, and 100 mm) was measured every 5 mm in a longitudinal direction of the film. Results of Example 1 are shown in a graph of FIG. 9 and results of Comparative Example 1 are shown in a graph of FIG. 10. Further, variations (standard deviations) of the phase difference value (Δnd) in a longitudinal direction of the PVA film at the predetermined distance are shown in the following Table 1. Moreover, a photograph of the polarizer of Example 1 is shown in FIG. 11 and a photograph of the polarizer of Comparative Example 1 is shown in FIG. 12.

TABLE 1

Variation (standard deviation) of phase difference value (Δnd) in longitudinal direction of PVA film

|  | Example 1 | Comparative Example 1 |
| --- | --- | --- |
| 10 mm | 32.43 | 46.88 |
| 30 mm | 7.47 | 16.70 |
| 50 mm | 9.28 | 16.79 |
| 100 mm | 8.26 | 9.74 |

As can be noted from Table 1, in Example 1, as compared to Comparative Example 1, in which the whole PVA film was brought into contact with the liquid in each process, the variation (standard deviation) of the phase difference value (Δnd) in the longitudinal direction of the PVA film was small, and generation of uneven stretching of the polarizer was prevented. Further, in Example 1, when a contact region with the liquid was further limited in an inner direction, generation of the uneven stretching was further prevented. Moreover, as shown in photographs of FIGS. 11 and 12, although uneven stretching was visually confirmed in Comparative Example 1, uneven stretching was not visually confirmed in Example 1. Improvement in uniformity of the polarizer in Example 1 was also visually apparent.

Industrial Applicability

As described above, the method of manufacturing a polarizer of the present invention makes it possible to virtually simultaneously perform contact of a hydrophilic polymer film with liquid and stretch of the hydrophilic polymer film in a width direction by grip means. Examples of the applications of a polarizer of the present invention as well as a polarizing plate, an optical film, a composite polarizing plate, and an image display using the same include office automation equipment such as a desktop personal computer, a notebook personal computer, and a copier, portable devices such as a cell-phone, a watch, a digital camera, a personal digital assistant (PDA), and a hand-held game device, home appliances such as a video camera, a television set, and a microwave oven, car equipment such as a back monitor, a monitor for car navigation system, and a car audio system, display equipment such as information monitors for commercial shops, security equipment such as surveillance monitors, and care and medical equipment such as a monitor for care and a monitor for medical use. The applications thereof are not limited and they are applicable over a wide range of fields.

The invention claimed is:

1. A method of manufacturing a polarizer, comprising:
a width direction stretching process for stretching a hydrophilic polymer film in the width direction, which is continuously supplied, by gripping both ends in a width direction thereof with grips and moving the grips in a longitudinal direction of the hydrophilic polymer film as well as by bringing the hydrophilic polymer film into contact with liquid and also moving at least one of the grips, which grip both ends in the width direction of the hydrophilic polymer film, outwardly in the width direction of the hydrophilic polymer film; and a dyeing process for dyeing the hydrophilic polymer film by a dichroic material, wherein, in the width direction stretching process, a contact with the liquid is carried out by at least one of spraying and coating of the liquid, wherein the width direction stretching process is carried out in at least one of the dyeing process and a process other than the dyeing process, wherein, in the width direction stretching process, there is a virtual line that connects inner ends of the grips in a width direction of the hydrophilic polymer film, the grips being adjacent in a longitudinal direction of the film, and the region inside of the virtual line is brought into contact with the liquid and a region outside of the virtual line is not brought into contact with the liquid, and wherein, in the contact with the liquid in the width direction stretching process, a region inside of a second virtual line that is 5 mm inside of the virtual line in a width direction of the film is brought into contact with the liquid and a region outside of the second virtual line is not brought into contact with the liquid.

2. The method of manufacturing a polarizer according to claim 1, wherein the process other than the dyeing process includes at least one of a swelling process for swelling the hydrophilic polymer film, and a crosslinking process for crosslinking the hydrophilic polymer film.

3. The method of manufacturing a polarizer according to claim 1, wherein the dyeing process and the process other than the dying process are carried out while a treatment liquid of each process being in contact with the hydrophilic polymer film, and the contact with the liquid in at least one of the width direction stretching process, the dyeing process, and the process other than the dying process is carried out in a gas phase by spraying the liquid onto at least one surface of the hydrophilic polymer film.

4. The method of manufacturing a polarizer according to claim 3, wherein a process, in which the contact with the liquid is carried out by spraying, is carried out while feeding the hydrophilic polymer film in a longitudinal direction, and the spraying is carried out in a space in which the sprayed liquid is prevented from being leaked to an external environment by a leak preventer.

5. The method of manufacturing a polarizer according to claim 4, wherein a pressure in the space, in which the sprayed liquid is prevented from being leaked, is lower than the pressure outside the space.

6. The method of manufacturing a polarizer according to claim 1, wherein the hydrophilic polymer film is a polyvinyl alcohol film and the dichroic material is iodine.

7. A polarizer manufactured by a method of manufacturing a polarizer according to claim 1.

8. A polarizing plate comprising a protective layer laminated on at least one surface of a polarizer, wherein the polarizer is a polarizer according to claim 7.

9. An optical film comprising a retardation film laminated on at least one surface of a polarizer, wherein the polarizer is a polarizer according to claim 7.

10. An optical film comprising a retardation film laminated on at least one surface of a polarizing plate, wherein the polarizing plate is the aforementioned polarizing plate according to claim 8.

11. A method of manufacturing a composite polarizing plate comprising a polarizing plate and a reflective polarizer, wherein the method comprises:

a process for providing a long length film polarizing plate having an absorption axis in a width direction of the film and comprising a polarizer according to claim 7;

a process for providing a long length film reflective polarizer having a reflective axis in a width direction of the film; and a bonding process for bonding the polarizing plate and the reflective polarizer while feeding them in a longitudinal direction of the film, respectively.

12. A composite polarizing plate manufactured by a method of manufacturing a composite polarizing plate according to claim 11.

13. An image display comprising a polarizer, wherein the polarizer is a polarizer according to claim 7.

14. An image display comprising a polarizing plate, wherein the polarizing plate is a polarizing plate according to claim 8.

15. An image display comprising an optical film, wherein the optical film is an optical film according to claim 9 or 10.

16. An image display comprising a composite polarizing plate, wherein the composite polarizing plate is a composite polarizing plate according to claim 12.

* * * * *